United States Patent
Sawayama et al.

(10) Patent No.: US 8,694,190 B2
(45) Date of Patent: Apr. 8, 2014

(54) REGENERATION CONTROL DEVICE, HYBRID VEHICLE, REGENERATION CONTROL METHOD, AND COMPUTER PROGRAM

(75) Inventors: Akira Sawayama, Tokyo (JP); Masahiro Suzuki, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 13/876,179

(22) PCT Filed: Oct. 20, 2011

(86) PCT No.: PCT/JP2011/074157
§ 371 (c)(1),
(2), (4) Date: Mar. 27, 2013

(87) PCT Pub. No.: WO2012/053592
PCT Pub. Date: Apr. 26, 2012

(65) Prior Publication Data
US 2013/0253742 A1 Sep. 26, 2013

(30) Foreign Application Priority Data
Oct. 21, 2010 (JP) ................................ 2010-236607

(51) Int. Cl.
*B60T 8/64* (2006.01)
(52) U.S. Cl.
USPC ........... 701/22; 180/65.21; 303/152; 903/947
(58) Field of Classification Search
USPC ................ 701/1, 22, 70; 180/65.21; 303/152; 903/974
See application file for complete search history.

(56) References Cited

U.S. PATENT DOCUMENTS

| 5,472,265 | A * | 12/1995 | Ohnuma | 303/3 |
| 5,568,962 | A * | 10/1996 | Enomoto et al. | 303/3 |
| 5,923,093 | A * | 7/1999 | Tabata et al. | 290/40 C |
| 6,086,166 | A * | 7/2000 | Fukasawa | 303/152 |
| 7,136,737 | B2 * | 11/2006 | Ashizawa et al. | 701/70 |
| 7,567,042 | B2 * | 7/2009 | Kang et al. | 318/362 |
| 2001/0024062 | A1 * | 9/2001 | Yoshino | 303/152 |

(Continued)

FOREIGN PATENT DOCUMENTS

JP 2000-125405 A 4/2000

OTHER PUBLICATIONS

The International Search Report of the corresponding International Application, PCT/JP2011/074157 dated Nov. 15, 2011.

*Primary Examiner* — Thomas Black
*Assistant Examiner* — Ce Li
(74) *Attorney, Agent, or Firm* — Cowan, Liebowitz & Latman, P.C.; Mark Montague

(57) ABSTRACT

A regeneration control device of a hybrid vehicle detects brake fluid pressure for detecting the amount of engagement of the brakes of the hybrid vehicle, and performs a first regeneration control in a closed state of the accelerator and the brake pedal not being depressed, a second regeneration control in the closed state of the accelerator and the brake pedal being depressed, and a third regeneration control when the accelerator pedal is in the closed state and the brake fluid pressure exceeds a predetermined value, wherein X(Nm/s) is set as the rate of increase of regenerative torque in the first regeneration control, Y(Nm/s) is set as the rate of increase of regenerative torque in the second regeneration control, and Z(Nm/s) is set as the rate of increase of regenerative torque in the third regeneration control, then X<y<Z is satisfied.

7 Claims, 4 Drawing Sheets

(56) References Cited

U.S. PATENT DOCUMENTS

| | | | |
|---|---|---|---|
| 2001/0038243 A1* | 11/2001 | Isono | 303/116.1 |
| 2003/0173826 A1* | 9/2003 | Tazoe et al. | 303/152 |
| 2008/0255716 A1* | 10/2008 | Bandai et al. | 701/22 |
| 2009/0118887 A1* | 5/2009 | Minarcin et al. | 701/22 |
| 2011/0202234 A1* | 8/2011 | Bradley et al. | 701/36 |

* cited by examiner

REGENERATION CONTROL DEVICE, HYBRID VEHICLE, REGENERATION CONTROL METHOD, AND COMPUTER PROGRAM

CROSS REFERENCE TO RELATED APPLICATIONS

This is a U.S. national stage of application No. PCT/JP2011/074157, filed on Oct. 20, 2011. Priority under 35 U.S.C. §119(a) and 35 U.S.C. §365(b) is claimed from Japanese Patent Application No. 2010-236607, filed on Oct. 21, 2010, the disclosure of which are also incorporated herein by reference.

TECHNICAL FIELD

The present invention relates to a regeneration control device, a hybrid vehicle, a regeneration control method, and a computer program.

BACKGROUND ART

A hybrid vehicle includes an engine and an electric motor and is capable of running by the engine or the electric motor, or is capable of running by the cooperation between the engine and the electric motor. During the deceleration of the hybrid vehicle, the electric motor can regenerate electric power. When the regenerative power generation is performed, regeneration torque is generated at the electric motor. The regeneration torque becomes the friction against the run of the hybrid vehicle and works as braking force similarly to the engine breaking. (for example, see patent literature PTL1).

CITATION LIST

Patent Literature

PTL1: JP 2007-223421 A

SUMMARY OF INVENTION

Technical Problem

As described above, the regeneration torque generated by the electric motor works as the braking force for the hybrid vehicle. In a conventional hybrid vehicle, the magnitude of the regeneration torque varies in two steps depending on whether the driver depresses the brake pedal (in other words, whether the brake lights are lighted). For example, the magnitude of the regeneration torque varies between a state in which the accelerator is closed and the brake pedal is not depressed and a state in which the accelerator is closed and the brake pedal is depressed.

In such a control of the regeneration torque, the regeneration torque is switched to large regeneration torque even if the driver only slightly puts the driver's foot on the brake pedal. At that time, the driver feels the braking force more than the driver has required and then, for example, accelerates the vehicle again with depressing the accelerator pedal. This lowers the fuel efficiency. Further, in terms of the drivability of the driver, it is unfavorable that the driver feels the braking force more than the driver has required.

Once the driver gets used to the drivability in which only slightly putting the driver's foot on the brake pedal generates large braking force, the driver tends to refrain from a brake operation until large braking force is required. As a result, the driver would slightly depress the brake pedal less frequently and deeply depresses the brake pedal more frequently. This reduces the amount of regeneration because there is not time enough for regenerating electric power and a desired deceleration is more frequently accomplished only at the friction brake side.

In light of the foregoing, an objective of the present invention is to provide a regeneration control device, a hybrid vehicle, a regeneration control method, and a computer program that can secure the amount of regeneration without detracting from the driver's drivability.

Solution to Problem

An aspect of the present invention is directed to a regeneration control device. The regeneration control device of a hybrid vehicle that includes an engine and an electric motor, that is capable of running by the engine or the electric motor or capable of running by a cooperation between the engine and the electric motor, and that is capable of performing regenerative power generation with the electric motor at least during deceleration, the regeneration control device includes detection means for detecting a performance of a brake of the hybrid vehicle, wherein the regeneration control device performs a first regeneration control that is performed in a state in which an accelerator of the hybrid vehicle is in a closed state and a brake pedal is not depressed, a second regeneration control that is performed in a state in which the accelerator of the hybrid vehicle is in the closed state and the brake pedal is depressed, and a third regeneration control that is performed when the accelerator of the hybrid vehicle is in the closed state and a detection result from the detection means exceeds a predetermined value, and $X<Y<Z$ is provided when an increase rate of regeneration torque in the first regeneration control is set at $X(Nm/s)$, an increase rate of regeneration torque in the second regeneration control is set at $Y(Nm/s)$, and an increase rate of regeneration torque in the third regeneration control is set at $Z(Nm/s)$.

Another aspect of the present invention is directed to a hybrid vehicle. The hybrid vehicle includes the regeneration control device according to the aspect of the present invention.

A further aspect of the present invention is directed to a regeneration control method. The regeneration control method of a hybrid vehicle that includes an engine and an electric motor, that is capable of running by the engine or the electric motor or capable of running by a cooperation between the engine and the electric motor, and that is capable of performing regenerative power generation with the electric motor at least during deceleration, the regeneration control method includes: a first regeneration step that is performed in a state in which an accelerator of the hybrid vehicle is in a closed state and a brake pedal is not depressed; a second regeneration step that is performed in a state in which the accelerator of the hybrid vehicle is in the closed state and the brake pedal is depressed; and a third regeneration step that is performed when the accelerator of the hybrid vehicle is in the closed state and a detection result from the detection means exceeds a predetermined value, wherein $X<Y<Z$ is provided when an increase rate of regeneration torque in the first regeneration step is set at $X(Nm/s)$, an increase rate of regeneration torque in the second regeneration step is set at $Y(Nm/s)$, and an increase rate of regeneration torque in the third regeneration step is set at $Z(Nm/s)$.

A further aspect of the present invention is a computer program. The computer program causes an information processing apparatus to implement a function of the regeneration control device according to the aspect of the present invention.

Advantageous Effects of Invention

The present invention can secure the amount of regeneration without detracting from the driver's drivability.

DESCRIPTION OF EMBODIMENTS

Hereinafter, the hybrid vehicle according to an embodiment of the present invention will be described with reference to FIGS. 1 to 4.

Figure 1:
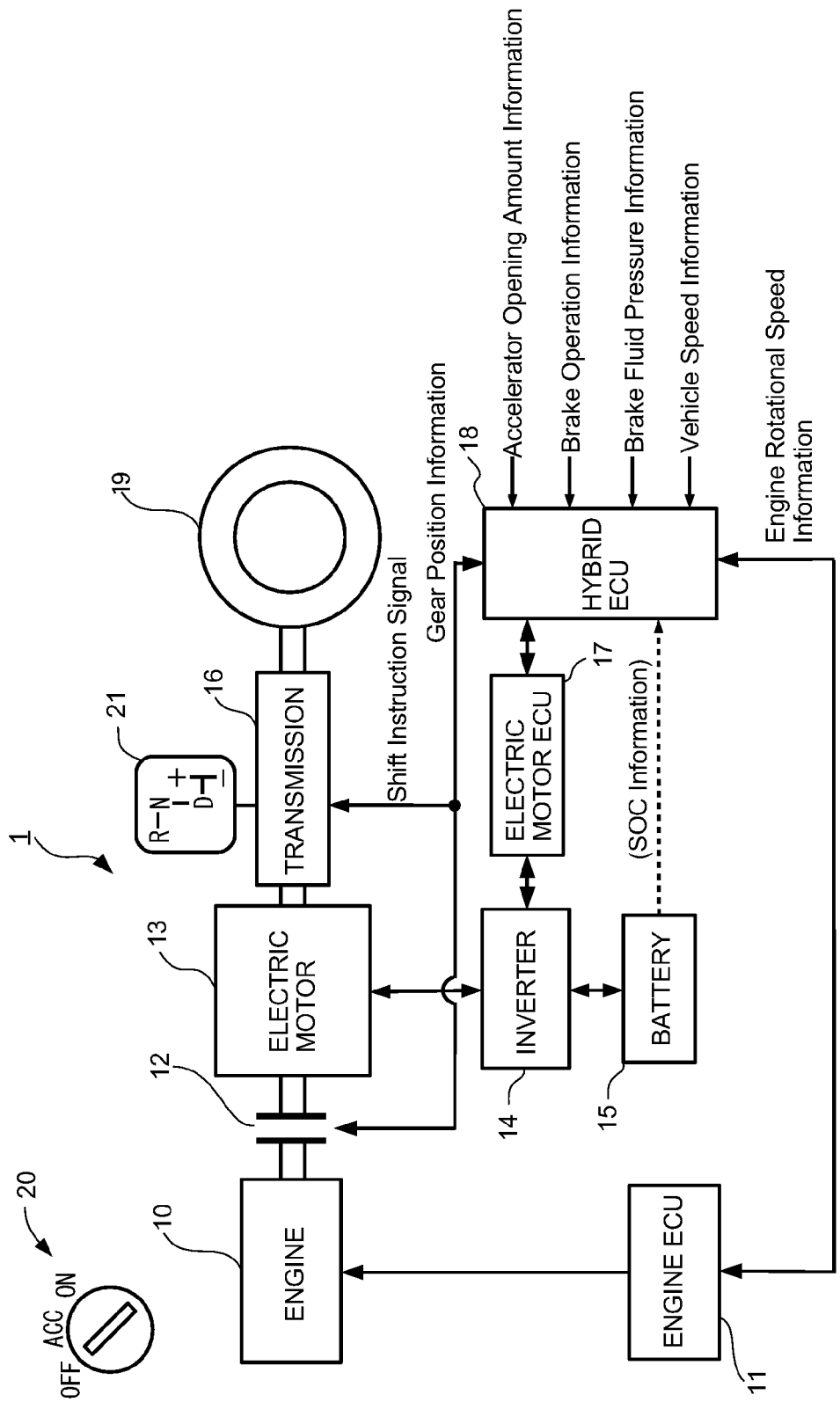
FIG. 1 is a block diagram for illustrating an exemplary structure of a hybrid vehicle according to an embodiment of the present invention.

FIG. 1 is a block diagram for illustrating an exemplary structure of a hybrid vehicle 1. The hybrid vehicle 1 is an example of a vehicle. The hybrid vehicle 1 is driven by an engine (internal combustion engine) 10 and/or an electric motor 13 through a gear box that is an automated mechanical/manual transmission. For example, when the hybrid vehicle decelerates, the electric motor 13 can regenerate electric power. Without detracting from the driver's drivability, the hybrid vehicle 1 can coordinate the braking force caused by the brake operation by the driver during deceleration with the braking force caused by the regeneration torque of the electric motor 13. Note that the automated mechanical/manual transmission is a transmission that can automatically shift the gears while having the same structure as a manual transmission.

The hybrid vehicle 1 includes the engine 10, an engine Electronic Control Unit (ECU) 11, a clutch 12, the electric motor 13, an inverter 14, a battery 15, a transmission 16, a motor ECU 17, a hybrid ECU 18, a wheel 19, a key switch 20 and a shift unit 21. Note that the transmission 16 includes the above-mentioned automated mechanical/manual transmission, and is operated by the shift unit 21 including a drive range (hereinafter, referred to as a D (Drive) range).

The engine 10 is an example of an internal combustion engine, and is controlled by the engine ECU 11. The engine 10 internally combusts gasoline, light oil, Compressed Natural Gas (CNG), Liquefied Petroleum Gas (LPG), alternative fuel, or the like in order to generate power for rotating a shaft and transmit the generated power to the clutch 12.

The engine ECU 11 is a computer working in coordination with the motor ECU 17 according to the instructions from the hybrid ECU 18, and controls the engine 10, for example, the amount of fuel injection and the valve timing. For example, the engine ECU 11 includes a Central Processing Unit (CPU), an Application Specific Integrated Circuit (ASIC), a microprocessor (microcomputer), a Digital Signal Processor (DSP), and the like, and internally has an operation unit, a memory, an Input/Output (I/O) port, and the like.

The clutch 12 is controlled by the hybrid ECU 18, and transmits the shaft output from the engine 10 to the wheel 19 through the electric motor 13 and the transmission 16. In other words, the clutch 12 mechanically connects the rotating shaft of the engine 10 to the rotating shaft of the electric motor 13 by the control of the hybrid ECU 18 in order to transmit the shaft output of the engine 10 to the electric motor 13. On the other hand, the clutch 12 cuts the mechanical connection between the rotating shaft of the engine 10 and the rotating shaft of the electric motor 13 so that the shaft of the engine 10 and the rotating shaft of the electric motor 13 can rotate at different rotational speeds from each other.

For example, the clutch 12 mechanically connects the rotating shaft of the engine 10 to the rotating shaft of the electric motor 13, for example, when the hybrid vehicle 1 runs by the power of the engine 10 and this causes the electric motor 13 to generate electric power, when the driving force of the electric motor 13 assists the engine 10, and when the electric motor 13 starts the engine 10.

Further, for example, the clutch 12 cuts the mechanical connection between the rotating shaft of the engine 10 and the rotating shaft of the electric motor 13 when the engine 10 stops or is in an idling state and the hybrid vehicle 1 runs by the driving force of the electric motor 13, and when the hybrid vehicle 1 reduces the speed or runs on the downgrade and the electric motor 13 generates (regenerates) electric power while the engine 10 stops or is in an idling state.

Note that the clutch 12 differs from the clutch operated by the driver's operation of a clutch pedal, and is operated by the control of the hybrid ECU 18.

The electric motor 13 is a so-called motor generator that supplies a shaft output to the transmission 16 by generating the power for rotating the shaft using the electric power supplied from the inverter 14, or that supplies electric power to the inverter 14 by generating the electric power using the power for rotating the shaft supplied from the transmission 16. For example, when the hybrid vehicle 1 gains the speed or runs at a constant speed, the electric motor 13 generates the power for rotating the shaft to supply the shaft output to the transmission 16 in order to cause the hybrid vehicle 1 to run in cooperation with the engine 10. Further, the electric motor 13 works as an electric generator, for example, when the electric motor 13 is driven by the engine 10, or when the hybrid vehicle 1 runs without power, for example, when the hybrid vehicle 1 reduces the speed or runs on the downgrade. In that case, electric power is generated by the power for rotating the shaft supplied from the transmission 16 and is supplied to the inverter 14 in order to charge the battery 15.

The inverter 14 is controlled by the motor ECU 17, and converts the direct voltage from the battery 15 into an alternating voltage or converts the alternating voltage from the electric motor 13 into a direct voltage. When the electric motor 13 generates power, the inverter 14 converts the direct voltage from the battery 15 into an alternating voltage and supplies the electric power to the electric motor 13. When the electric motor 13 generates electric power, the inverter 14 converts the alternating voltage from the electric motor 13 into a direct voltage. In other words, in that case, the inverter 14 works as a rectifier and a voltage regulator for supplying a direct voltage to the battery 15.

Note that the magnitude of the regeneration torque of the electric motor 13 is proportional to the magnitude of the current flowing in a coil (not illustrated in the drawings) of the electric motor 13. Thus, by regulating the amount of the current when the inverter 14 supplies the direct voltage to the battery 15, the magnitude of the regeneration torque of the electric motor 13 can be regulated.

The battery 15 is a secondary cell capable of being charged and discharged. The battery 15 supplies electric power to the electric motor 13 through the inverter 14 when the electric motor 13 generates power. Alternatively, the battery 15 is charged with the electric power generated by the electric motor 13 when the electric motor 13 generates electric power.

The transmission 16 includes an automated mechanical/manual transmission (not shown in the drawings) that selects one of a plurality of gear ratios (change gear ratios) according to the shift instruction signal from the hybrid ECU 18 in order to shift the change gear ratios and transmit the gear-shifted power of the engine 10 and/or the power of the electric motor 13 to the wheel 19. Alternatively, the transmission 16 transmits the power from the wheel 19 to the electric motor 13, for example, when the vehicle reduces the speed or runs on the downgrade. Note that the automated mechanical/manual transmission can also shift the gear position to a given gear number by the driver's hand operation of the shift unit 21.

The motor ECU 17 is a computer working in coordination with the engine ECU 11 according to the instructions from the hybrid ECU 18, and controls the electric motor 13 by controlling the inverter 14. For example, the motor ECU 17 includes a CPU, an ASIC, a microprocessor (microcomputer), a DSP, and the like, and internally has an operation unit, a memory, an I/O port, and the like.

The hybrid ECU 18 is an example of a computer. For hybrid driving, the hybrid ECU 18 obtains accelerator opening amount information, brake operation information, vehicle speed information, brake fluid pressure information, the gear position information obtained from the transmission 16, and the engine rotational speed information obtained from the engine ECU 11 in order to refer to the information, resultantly control the clutch 12 and supply the shift instruction signal in order to control the transmission 16. For hybrid driving, the hybrid ECU 18 further gives the instruction to the motor ECU 17 to control the electric motor 13 and the inverter 14 based on the obtained State of Charge (SOC) information on the battery 15 and other information, and gives the instruction to the engine ECU 11 to control the engine 10. For example, the hybrid ECU 18 includes a CPU, an ASIC, a microprocessor (microcomputer), a DSP, and the like, and internally has an operation unit, a memory, an I/O port, and the like.

Note that a computer program to be executed by the hybrid ECU 18 can be installed on the hybrid ECU 18 that is a computer in advance by being stored in a non-volatile memory inside the hybrid ECU 18 in advance.

The engine ECU 11, the motor ECU 17, and the hybrid ECU 18 are connected to each other, for example, through a bus complying with the standard of the Control Area Network (CAN) or the like.

The wheel 19 is a drive wheel for transmitting the driving force to the road surface. Note that, although only a wheel 19 is illustrated in FIG. 1, the hybrid vehicle 1 actually includes a plurality of the wheels 19.

The key switch 20 is a switch that is turned ON/OFF, for example, by insertion of a key by the user at the start of drive. Turning ON the switch activates each unit of the hybrid vehicle 1, and turning OFF the key switch 20 stops each unit of the hybrid vehicle 1.

Figure 2:
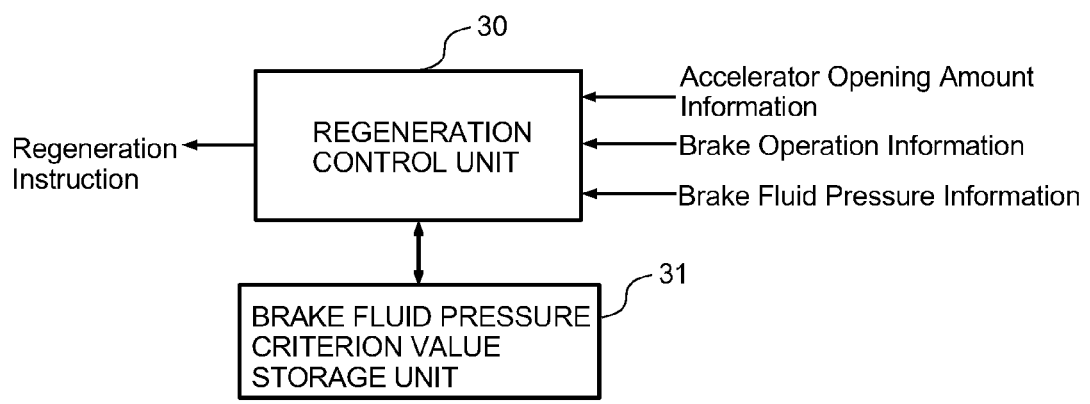
FIG. 2 is a block diagram for illustrating an exemplary configuration of a function implemented in a hybrid ECU illustrated in FIG. 1.

FIG. 2 is a block diagram for illustrating an exemplary configuration of a function implemented in the hybrid ECU 18 executing a computer program. In other words, when the hybrid ECU 18 executes a computer program, the functions of a regeneration control unit 30 and a brake fluid pressure criterion value storage unit 31 are implemented.

The regeneration control unit 30 instructs the motor ECU 14 to perform regeneration based on the accelerator opening amount information, the brake operation information, and the brake fluid pressure information. The brake fluid pressure criterion value storage unit 31 is implemented by allotting the region in a part of the memory included in the hybrid ECU 18 thereto, and storages a brake fluid pressure criterion value that has been generated by the regeneration control unit 30 based on the brake operation information and the brake fluid pressure information.

Figure 3:
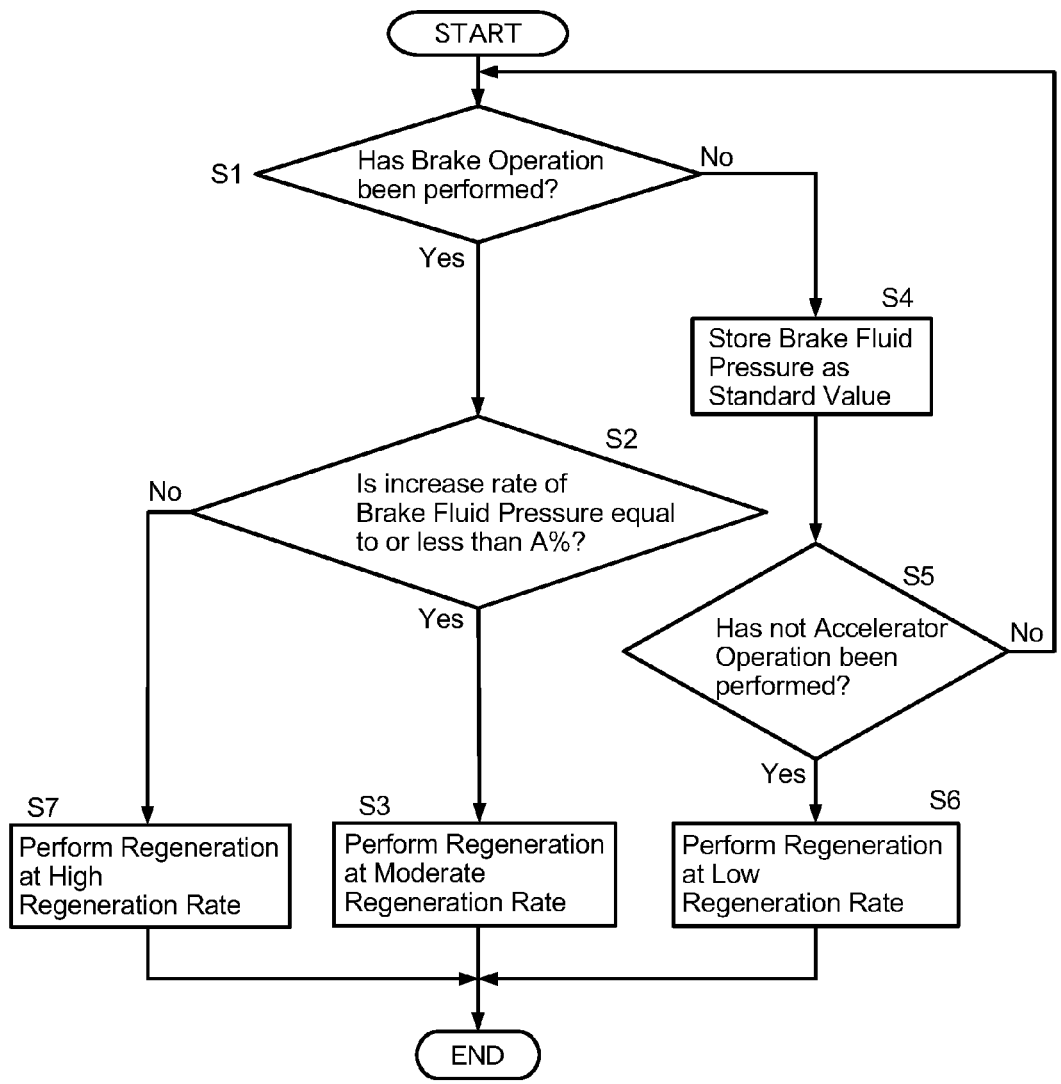
FIG. 3 is a flowchart for illustrating a process for controlling regeneration by a regeneration control unit illustrated in FIG. 2.

Next, the process for the regeneration control performed in the hybrid ECU 18 executing the computer program will be described with reference to the flowchart illustrated in FIG. 3. Note that the procedures in FIG. 3 are a cycle of the process, and the process is repeatedly performed as long as the key switch 20 is the ON state. Note that it is assumed in the below description that the hybrid vehicle 1 runs while regenerating electric power with the electric motor 13 without an accelerator operation. At that time, the clutch 12 can be in any state. For example, the clutch 12 can be disengaged while the electric motor 13 regenerates electric power, or the clutch 12 can be engaged while the engine braking of the engine 10 and the regeneration torque caused by the regeneration by the electric motor 13 work as braking force.

In the "START" illustrated in FIG. 3, the hybrid ECU 18 has executed a computer program, and the regeneration control unit 30 and the brake fluid pressure criterion value storage unit 31 are implemented by the hybrid ECU 18. Then, the process goes to step S1.

In step S1, the regeneration control unit 30 determines whether a brake operation is performed. When it is determined that a brake operation is performed, the process goes to step S2. On the other hand, when it is determined in step S1 that a brake operation is not performed, the process goes to step S4.

In step S2, the regeneration control unit 30 calculates the increase rate of the brake fluid pressure and determines whether the increase rate is equal to or less than A %. The increase rate of the brake fluid pressure is the rate of increasing from the brake fluid pressure at the time when a brake operation is not performed being stored in step S4 described below to the brake fluid pressure immediately after the brake has been operated. When it is determined in step S2 that the increase rate of the brake fluid pressure is equal to or less than A %, the process goes to step S3. On the other hand, when it is determined in step S2 that that the increase rate of the brake fluid pressure exceeds A %, the process goes to step S7. Note that the A % is set, for example, at 12 to 13%.

In step S3, the regeneration control unit 30 performs regeneration at a "moderate regeneration rate", and terminates a cycle of the process. Note that the "moderate regeneration rate" will be described in detail below.

In step S4, the regeneration control unit 30 stores the brake fluid pressure at the time when the brake operation is not performed as the standard value in the brake fluid pressure standard value storage unit 31. Then, the process goes to step S5.

In step S5, the regeneration control unit 30 determines whether an accelerator operation is performed. When it is determined that an accelerator operation is not performed, the process goes to step S6. On the other hand, when it is determined in step S5 that an accelerator operation is performed, the process goes back to step S1.

In step S6, the regeneration control unit 30 performs regeneration at a "low regeneration rate", and terminates a cycle of the process. Note that the "low regeneration rate" will be described in detail below.

In step S7, the regeneration control unit 30 performs regeneration at a "high regeneration rate", and terminates a cycle of the process. Note that the "high regeneration rate" will be described in detail below.

Figure 4:
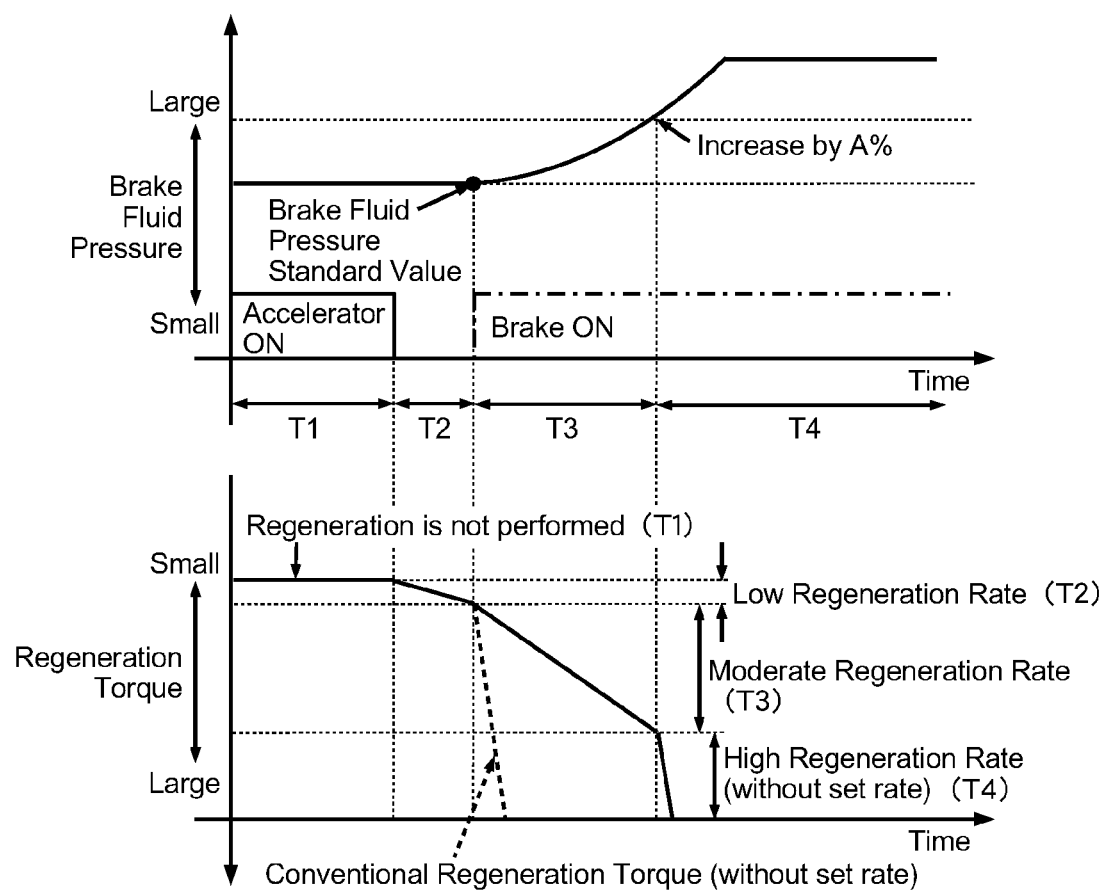
FIG. 4 is a view for describing, with the time course, the variations of the brake fluid pressure and the regeneration torque in the process of the regeneration control in the regeneration control unit illustrated in FIG. 2.

FIG. 4 is a view for describing, with the time course, the variations of the fluid pressure of the brake and the regeneration torque in the process of the regeneration control in the regeneration control unit 30. The brake fluid pressure becomes larger from the bottom of the drawing to the top. The regeneration torque becomes larger from the top of the drawing to the bottom. The brake fluid pressure is the pressure of the brake oil in a brake master cylinder (not illustrated in the drawings), and varies depending on the atmospheric pressure, the temperature, or the like at that time (for example, around 9 to 10%). Thus, the brake fluid pressure at the time when a brake operation is not performed cannot be set as a predetermined fixed value. In light of the foregoing, as illustrated in FIG. 4, the regeneration control unit 30 stores the brake fluid pressure at the time when a brake operation is not performed as the standard value in the brake fluid pressure standard value storage unit 31 while momentarily updating the standard value (step S4).

While the accelerator is in the ON state (term T1), operating the accelerator accelerates the hybrid vehicle 1. Thus, the regeneration by the electric motor 13 is not performed. Note that, for example, when the SOC of the battery 15 decreases, the electric motor 13 sometimes performs regeneration as an electric generator with the output from the engine 10 even if the hybrid vehicle 1 accelerates. However, such a case is not taken into consideration herein.

Here, while the accelerator operation is not performed (the accelerator is in the closed state) (term T2), the regeneration is performed at the "low regeneration rate". In the regeneration at the "low regeneration rate", the regeneration torque is minimized. For example, the regeneration torque that increases at an increase rate of about a newton meter per second ($\square$Nm/s) is generated. This gradually increases the deceleration of the hybrid vehicle 1.

Here, when a brake operation is performed (it is illustrated as BRAKE ON in the drawing) (term T3), the regeneration is performed at the "moderate regeneration rate". In the regeneration at the "moderate regeneration rate", for example, the regeneration torque that increases at an increase rate of about two newton meters per second ($\square$Nm/s) is generated. This causes the hybrid vehicle 1 to run at a deceleration in which the braking force works more because of the increased regeneration torque in addition to the braking force caused by the service brake.

Then, the brake operation is further operated. When the increase rate of the brake fluid pressure at that time is equal to or more than A % (term T4), the regeneration is performed at the "high regeneration rate". The regeneration at the "high regeneration rate" is regeneration with the maximum regeneration torque, and the regeneration torque is generated at the maximum rate. This causes the hybrid vehicle 1 to run at the maximum deceleration in which the braking force caused by the regeneration torque strongly works in addition to the braking force caused by the service brake. Note that a rate is not set as the maximum rate. The maximum rate occurs in a state in which the rate happens to increase according to the characteristics of the electric motor 13, the inverter 14 and the like.

Note that the regeneration torque in a conventional regeneration control is illustrated as a comparison example with a broken line in FIG. 4. In the prior art, the regeneration torque has happened to increase to the maximum regeneration torque without a set increase rate (in other words, at the above-mentioned maximum rate) as soon as a brake operation has been performed.

Effects

Performing the regeneration at the "low regeneration rate" in which the accelerator is in the closed state and the brake pedal is not depressed, performing the regeneration at the "moderate regeneration rate" in which the brake pedal is depressed even if only slightly, and performing the regeneration at the "high regeneration rate" in which the brake fluid pressure increases by more than A %, the hybrid vehicle 1 can secure the amount of regeneration without detracting from the driver's drivability. In the example of the prior art illustrated as a comparison example in FIG. 4, even if the driver only slightly performs a brake operation, the regeneration torque would rapidly increase. This brings an uncomfortable feeling about the drivability to the driver. However, the control by the regeneration control unit 30 according to an embodiment of the present invention rarely brings an uncomfortable feeling about the drivability to the driver.

Further, the increase in the brake fluid pressure is determined while compared with the brake fluid pressure at the time when the brake pedal is not depressed, so that an appropriate regeneration rate can constantly be set even if the atmospheric pressure or the temperature varies.

Other Embodiments

Although the value of A that is a threshold of the increase rate of the brake fluid pressure has been described as a fixed value in the above-mentioned embodiment, the value of the A can variably be set. For example, when the SOC of the battery 15 is high and the battery 15 cannot be charged any more, the threshold A is set at a relatively large value. This can prevent the value indicating the SOC from increasing by reducing the electric power to be generated by the electric motor 13 because the "high regeneration rate" occurs only when the brake pedal is strongly depressed. Note that the regeneration control unit 30 can automate the switch of the threshold A by detecting the value indicating the SOC of the battery 15.

Alternatively, when the gross weight of the hybrid vehicle 1 is relatively large, or when the angle of the downgrade of the road surface on which the hybrid vehicle 1 runs is relatively large, it is favorable that a relatively large deceleration is obtained because it is difficult for the hybrid vehicle 1 to decelerate. In such a case, the regeneration rate is changed to a rapid rate (in other words, the inclination angle of the regeneration rate is increased). One or some of the low regeneration rate, the moderate regeneration rate, and the high regeneration rate can be changed. For example, the term T3 at the moderate regeneration rate is longer than that at the low regeneration rate, the high regeneration rate, or the like. Thus, the deceleration obtained by changing only the value of the moderate generation rate to a rapid rate becomes large. Further, a large deceleration can be obtained as soon as the accelerator gets into the OFF state also by changing the value of the low regeneration rate to a rapid rate together with the value of the moderate regeneration rate. Alternatively, the feeling of deceleration at the time when the accelerator is turned OFF can be obtained by changing only the value of the low regeneration rate to a rapid rate.

This facilitates a large deceleration because the deceleration relative to the depressed amount of the brake pedal increases. This brings a sufficient feeling of deceleration to the driver and thus can contribute to the improvement of the drivability. Note that the switch of the regeneration rate may be performed by the driver's hand operation according to the amount of cargo loaded on the hybrid vehicle 1 or the degree of the inclination of the road surface, or may be automatically performed by detecting the gross weight of the hybrid vehicle 1 or the degree of the inclination of the road surface with the regeneration control unit 30. The gross weight of the hybrid vehicle 1 can be found, for example, by measuring the load of the carrier using an axle load sensor provided on the axle. Alternatively, the gross weight of the hybrid vehicle 1 may also be estimated by checking the behavior of the running hybrid vehicle 1 (for example, see JP 2004-025956 A). Further, the inclination of the road surface on which the hybrid vehicle 1 runs can be found, for example, using an inclination sensor or the like.

The boundaries of the regions for determination may variously be changed, for example, the "equal to or more than" may be changed into "exceeds" and the "less than" may be changed into "equal to or less than" in the description of the above-mentioned flowchart.

Although the engine 10 has been described as an internal combustion engine, the engine 10 may also be a heat engine including an external combustion engine.

Further, while the computer program executed by the hybrid ECU 18 is installed on the hybrid ECU 18 in advance in the above-mentioned description, the computer program may be installed on the hybrid ECU 18 as a computer by attaching removable media recording the computer program (storing the computer program), for example, to a drive (not shown in the drawings) and storing the computer program read from the removable media in a non-volatile memory inside the hybrid ECU 18, or receiving, with a communication unit (not shown in the drawings), a computer program transmitted through a wired or wireless transmission medium and storing the computer program in a non-volatile memory inside the hybrid ECU 18.

Further, each ECU may be implemented by an ECU combining some or all of the functions of the ECUs. Alternatively, an ECU may newly be provided by the further subdivision of the function of each ECU.

Note that the computer program executed by the computer may be for performing the process in chronological order according to the order described herein or may be for performing the process in parallel or at the necessary timing, for example, when the computer program is invoked.

Further, the embodiments of the present invention are not limited to the above-mentioned embodiments, and may variously be modified without departing from the gist of the invention.

The invention claimed is:

1. A regeneration control device of a hybrid vehicle that includes an engine and an electric motor, that is capable of running by the engine or the electric motor or capable of running by a cooperation between the engine and the electric motor, and that is capable of performing regenerative power generation with the electric motor at least during deceleration, the regeneration control device comprising:
    a regeneration control unit for detecting a performance of a brake of the hybrid vehicle;
    wherein the regeneration control device performs:
    a first regeneration control that is performed in a state in which an accelerator of the hybrid vehicle is in a closed state and a brake pedal is not depressed;
    a second regeneration control that is performed in a state in which the accelerator of the hybrid vehicle is in the closed state, the brake pedal is depressed, and a detection result of the regeneration control unit is lower than a predetermined value; and
    a third regeneration control that is performed when the accelerator of the hybrid vehicle is in the closed state and the detection result of the regeneration control unit exceeds the predetermined value,
    wherein X<Y<Z is provided when an increase rate of regeneration torque in the first regeneration control is set at X(Nm/s), an increase rate of regeneration torque in the second regeneration control is set at Y(Nm/s), and an increase rate of regeneration torque in the third regeneration control is set at Z(Nm/s).

2. A hybrid vehicle comprising the regeneration control device according to claim 1.

3. The regeneration control device according to claim 1, wherein the regeneration control unit detects the performance of the brake as a brake fluid pressure.

4. A regeneration control method of a hybrid vehicle that includes an engine and an electric motor, that is capable of running by the engine or the electric motor or capable of running by a cooperation between the engine and the electric motor, and that is capable of performing regenerative power generation with the electric motor at least during deceleration, the regeneration control method comprising:
    a first regeneration step that is performed in a state in which an accelerator of the hybrid vehicle is in a closed state and a brake pedal is not depressed;
    a second regeneration step that is performed in a state in which the accelerator of the hybrid vehicle is in the closed state, the brake pedal is depressed, and a detection result of a performance of a brake of the hybrid vehicle is lower than a predetermined value; and
    a third regeneration step that is performed when the accelerator of the hybrid vehicle is in the closed state and the detection result of the performance of the brake exceeds a predetermined value,
    wherein X<y<Z is provided when an increase rate of regeneration torque in the first regeneration step is set at X(Nm/s), an increase rate of regeneration torque in the second regeneration step is set at Y(Nm/s), and an increase rate of regeneration torque in the third regeneration step is set at Z(Nm/s).

5. The regeneration control method according to claim 4, wherein the performance of the brake is detected as a brake fluid pressure.

6. A non-transitory computer-readable storage medium for storing a computer program causing an information processing apparatus to perform a regeneration control method of a hybrid vehicle that includes an engine and an electric motor, that is capable of running by the engine or the electric motor or capable of running by a cooperation between the engine and the electric motor, and that is capable of performing regenerative power generation with the electric motor at least during deceleration, the regeneration control method comprising:
    a first regeneration step that is performed in a state in which an accelerator of the hybrid vehicle is in a closed state and a brake pedal is not depressed;
    a second regeneration step that is performed in a state in which the accelerator of the hybrid vehicle is in the closed state, the brake pedal is depressed, and a detection result of a performance of a brake of the hybrid vehicle is lower than a predetermined value; and a third regeneration step that is performed when the accelerator of the hybrid vehicle is in the closed state and the detection result of the performance of the brake exceeds a predetermined value;

wherein $X<y<Z$ is provided when an increase rate of regeneration torque in the first regeneration step is set at $X(Nm/s)$, an increase rate of regeneration torque in the second regeneration step is set at $Y(Nm/s)$, and an increase rate of regeneration torque in the third regeneration step is set at $Z(Nm/s)$.

7. The non-transitory computer-readable storage medium according to claim 6, wherein the performance of the brake is detected as a brake fluid pressure.

* * * * *